United States Patent
Shirakawa et al.

(10) Patent No.: US 8,309,756 B2
(45) Date of Patent: Nov. 13, 2012

(54) SURFACE TREATING AGENT, ARTICLE AND FLUORINATED ETHER COMPOUND

(75) Inventors: Daisuke Shirakawa, Tokyo (JP); Yoshiyuki Gozu, Tokyo (JP); Taiki Hoshino, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/278,216

(22) Filed: Oct. 21, 2011

(65) Prior Publication Data

US 2012/0040189 A1 Feb. 16, 2012

Related U.S. Application Data

(63) Continuation of application No. PCT/JP2010/060495, filed on Jun. 21, 2010.

(30) Foreign Application Priority Data

Jun. 30, 2009 (JP) .................. 2009-155563

(51) Int. Cl.
C07C 69/52 (2006.01)
C07C 69/54 (2006.01)
B05D 5/08 (2006.01)
B32B 27/36 (2006.01)

(52) U.S. Cl. ............... 560/222; 427/393.4; 428/412

(58) Field of Classification Search ........... 560/222
See application file for complete search history.

(56) References Cited

U.S. PATENT DOCUMENTS 4,778,915 A * 10/1988 Lina et al. .................. 560/29

FOREIGN PATENT DOCUMENTS

| JP | 2007-536393 | 12/2007 |
| WO | WO 2005/113642 | 12/2005 |
| WO | WO 2008/154345 | 12/2008 |
| WO | WO 2010/062843 | 6/2010 |
| WO | WO 2010/080473 | 7/2010 |

OTHER PUBLICATIONS

International Search Report issued Sep. 21, 2010 in PCT/JP2010/060495 filed Jun. 21, 2010.
Masaaki Yamabe, et al.; "Development of Fluoro Functional Materials"; CMC Publishing Co., Ltd., popular edition, Sep. 10, 1997, pp. 151-166.

* cited by examiner

*Primary Examiner* — Brian J Davis
(74) *Attorney, Agent, or Firm* — Oblon, Spivak, McClelland, Maier & Neustadt, L.L.P.

(57) ABSTRACT

To provide a surface treating agent and a composition for surface treatment capable of forming a coating film excellent in the water/oil repellency, the efficiency for removal of oil-and-fat stains, alkali resistance and heat resistance and having a low coefficient of friction; a method for treating the surface of an article by using the surface treating agent or the composition for surface treatment; an article having surface treatment applied; and a novel fluorinated ether compound useful as a surface treating agent. A surface treating agent comprising a compound represented by the following formula (A):

$$R^F O(CF_2CF_2O)_a CF_2C(O)N(H)_b(\text{-}Q\text{-}OC(O)C(R)\!\!=\!\!CH_2)_{2-b} \quad (A)$$

wherein $R^F$ is a $C_{1-20}$ perfluoro monovalent saturated hydrocarbon group or the like; a is an integer of from 1 to 200; b is 0 or 1; Q is a $C_{1-6}$ alkylene group or the like; and R is a hydrogen atom or a $C_{1-3}$ alkyl group.

21 Claims, No Drawings

SURFACE TREATING AGENT, ARTICLE AND FLUORINATED ETHER COMPOUND

CROSS REFERENCE TO RELATED APPLICATION

This application is a continuation of PCT/JP10/060495, filed on Jun. 21, 2010, and claims priority to Japanese Patent Application No. 2009-155563, filed on Jun. 30, 2009.

TECHNICAL FIELD

The present invention relates to a surface treating agent, a method for treating the surface of an article by using the surface treating agent, an article having surface treatment applied, and a novel fluorinated ether compound useful as the surface treating agent.

BACKGROUND ART

Fluorinated compounds have been utilized as surface treating agents such as waiter/oil repellents. Articles having water/oil repellency or the like can be obtained by forming a coating film by applying the compounds on the surface of inorganic substrates (e.g. metals or glass) or resin substrates (e.g. polycarbonates). As such compounds, compounds having a perfluoroalkyl group and a (meth)acryloyloxy group (hereinafter referred to as a polymerizable group) have been known. As such compounds, for example, the following compound (1) may be mentioned (Non-Patent Document 1).

$$CF_3(CF_2)_7(CH_2)_2OC(O)CH=CH_2 \quad (1)$$

The compound (1) is applied on the surface of a substrate, followed by irradiation with ultraviolet rays or heat treatment, whereby a polymer is formed by the polymerization reaction of polymerizable groups. The polymer is withdrawn by hydroxy groups or other polar groups on the substrate, and perfluoroalkyl groups are arranged on the atmosphere side. As a result, a coating film formed by the compound (1) has water repellency.

However, it has been reported that the compound (1) is decomposed by the action of heat or an acid, and its decomposed product places a burden on the environment. Therefore, it is difficult to acquire the compound (1).

In recent years, as an alternative to the compound (1), the following compounds (2), (3) and (4) have been proposed. In the compound (3), s is an integer of from 8 to 13 and t is an integer of from 1 to 3. In the compound (4), u is an integer of from 1 to 200 (Patent Document 1, Non-Patent Document 1).

$$CF_3(CF_2)_5(CH_2)_2OC(O)C(CH_3)=CH_2 \quad (2)$$

$$CF_3(CF_2)_2O(CF_2CF_2CF_2O)_s-(CF_2)_2(CH_2)_tOC(O)CH=CH_2 \quad (3)$$

$$CF_3O(CF_2CF_2O)_uCF_2CH_2OC(O)C(CH_3)=CH_2 \quad (4)$$

However, according to preconsideration by the present inventors, with the compound (2), as the number of carbon atoms in the perfluoroalkyl group moiety is small, the crystallinity is low, and no practically sufficient water/oil repellency and efficiency for removal of oil-and-fat stains can be obtained.

The compound (3) is difficult to prepare due to the structure of the $(CF_2CF_2CF_2O)$ moiety. For example, since it is difficult to control the molecular weight in its preparation, the molecular weight distribution of the formed product tends to be large, or a compound wherein the number of the unsaturated group is 0 or 2 will form in addition to the desired compound wherein the number is 1, and accordingly when the compound (3) is used as a surface treating agent as it is, problems may arise such that there is unevenness in the performance.

Since the compound (4) is highly hydrolysable, even if a coating film is once formed, it tends to be decomposed by the influences of an acid or an alkali, and its performance tends to be deteriorated. Particularly when it is used as a surface treating agent for glass containing an alkali component, its water/oil repellency tends to be deteriorated.

PRIOR ART DOCUMENTS

Patent Document

Patent Document 1: JP-A-2007-536393

Non-Patent Document

Non-Patent Document 1: "Development of Fluoro Functional Materials" compiled by Masaaki Yamabe and Masashi Matsuo, published by CMC Publishing Co., Ltd., popular edition, first copy, Sep. 10, 1997, p. 151 to 166

DISCLOSURE OF INVENTION

Technical Problem

The present invention provides a surface treating agent capable of forming a coating film excellent in the water/oil repellency, the efficiency for removal of oil-and-fat stains, alkali resistance and heat resistance and having a low coefficient of friction; a composition for surface treatment capable of forming a coating film excellent in the water/oil repellency, the efficiency for removal of oil-and-fat stains, alkali resistance and heat resistance and having a low coefficient of friction; a method of forming on an article a coating film excellent in the water/oil repellency, the efficiency for removal of oil-and-fat stains, alkali resistance and heat resistance and having a low coefficient of friction, formed from the surface treating agent or the composition for surface treatment; an article having the coating film; and a novel fluorinated ether compound useful as a surface treating agent.

Solution to Problem

The present invention provides the following [1] to [14].

[1] A surface treating agent comprising a compound (A) represented by the following formula (A):

$$R^FO(CF_2CF_2O)_aCF_2C(O)N(H)_b(-Q-OC(O)C(R)=CH_2)_{2-b} \quad (A)$$

wherein $R^F$ is a $C_{1-20}$ perfluoro monovalent saturated hydrocarbon group or a $C_{2-20}$ perfluoro monovalent saturated hydrocarbon group having an etheric oxygen atom inserted between carbon atoms, and is a group having no —$OCF_2O$— structure, a is an integer of from 1 to 200, b is 0 or 1, Q is a $C_{1-6}$ alkylene group or -Ph-$(CH_2)_c$— (wherein Ph is a 1,4-phenylene group, and c is 0 or 1), and R is a hydrogen atom or a $C_{1-3}$ alkyl group.

[2] The surface treating agent according to [1], which is a finger print-removing property-imparting agent.

[3] A composition for surface treatment comprising a compound (A) represented by the following formula (A) and an organic solvent:

$$R^FO(CF_2CF_2O)_aCF_2C(O)N(H)_b(-Q-OC(O)C(R)=CH_2)_{2-b} \quad (A)$$

wherein $R^F$ is a $C_{1-20}$ perfluoro monovalent saturated hydrocarbon group or a $C_{2-20}$ perfluoro monovalent saturated hydrocarbon group having an etheric oxygen atom inserted between carbon atoms, and is a group having no —$OCF_2O$— structure, a is an integer of from 1 to 200,
b is 0 or 1,
Q is a $C_{1-6}$ alkylene group or -Ph-$(CH_2)_c$— (wherein Ph is a 1,4-phenylene group, and c is 0 or 1), and
R is a hydrogen atom or a $C_{1-3}$ alkyl group.

[4] The composition for surface treatment according to [3], wherein the organic solvent contains a fluorinated organic solvent.

[5] The composition for surface treatment according to [3] or [4], which contains the compound (A) in an amount of from 0.001 to 50 parts by mass per 100 parts by mass of the organic solvent.

[6] A method for treating the surface of an article, which comprises applying the surface treating agent as defined in [1] or [2] on the surface of a substrate, and curing the compound (A) to form a coating film, or applying the composition for surface treatment as defined in any one of [3] to [5] on the surface of a substrate, drying the organic solvent and curing the compound (A) to form a coating film.

[7] The method for treating the surface according to [6], wherein the substrate is a transparent substrate.

[8] The method for treating the surface according to [7], wherein the material of the transparent substrate is glass or a polycarbonate.

[9] The method for treating the surface according to any one of [6] to [8], wherein a finger print-removing property is imparted to the surface of the substrate.

[10] An article having a coating film formed by applying the surface treating agent as defined in [1] or [2] on the surface of a substrate and curing the compound (A), or having a coating film formed by applying the composition for surface treatment as defined in any one of [3] to [5] on the surface of a substrate, drying the organic solvent and curing the compound (A).

[11] The article according to [10], wherein the substrate is a transparent substrate.

[12] The article according to [11], wherein the material of the transparent substrate is glass or a polycarbonate.

[13] The article according to any one of [10] to [12], of which the surface has a finger print-removing property.

[14] A compound represented by the following formula (A):

$$R^FO(CF_2CF_2O)_aCF_2C(O)N(H)_b(-Q-OC(O)C(R)= CH_2)_{2-b} \quad (A)$$

wherein $R^F$ is a $C_{1-20}$ perfluoro monovalent saturated hydrocarbon group or a $C_{2-20}$ perfluoro monovalent saturated hydrocarbon group having an etheric oxygen atom inserted between carbon atoms, and is a group having no —$OCF_2O$— structure, a is an integer of from 1 to 200,
b is 0 or 1,
Q is a $C_{1-6}$ alkylene group or -Ph-$(CH_2)_c$— (wherein Ph is a 1,4-phenylene group, and c is 0 or 1), and
R is a hydrogen atom or a $C_{1-3}$ alkyl group.

Advantageous Effects of Invention

The surface treating agent of the present invention can form a coating film excellent in the water/oil repellency, the efficiency for removal of oil-and-fat stains, alkali resistance and heat resistance and having a low coefficient of friction.

The composition for surface treatment of the present invention can form a coating film excellent in the water/oil repellency, the efficiency for removal of oil-and-fat stains, alkali resistance and heat resistance and having a low coefficient of friction.

According to the method for treating the surface of an article of the present invention, a coating film-excellent in the water/oil repellency, the efficiency for removal of oil-and-fat stains, alkali resistance and heat resistance and having a low coefficient of friction can be formed on the surface of an article.

The article of the present invention has a coating film excellent in the water/oil repellency, the efficiency for removal of oil-and-fat stains, alkali resistance and heat resistance and having a low coefficient of friction.

The present invention provides a novel fluorinated ether compound useful as a surface treating agent.

DESCRIPTION OF EMBODIMENTS

In this specification, a compound represented by the formula (A) will be referred to as a compound (A). The same applied to compounds represented by other formulae.

In this specification, a perfluoro monovalent saturated hydrocarbon group is a group having all hydrogen atoms bonded to carbon atoms in a monovalent saturated hydrocarbon group substituted by fluorine atoms. The monovalent saturated hydrocarbon group is a group consisting of carbon atoms and hydrogen atoms and having no carbon atom-carbon atom unsaturated bond. The perfluoro monovalent saturated hydrocarbon group may have a linear structure, a branched structure, a cyclic structure or a structure having a partially branched structure and cyclic structure. In the present invention, the perfluoro monovalent saturated hydrocarbon group is preferably a group having a linear structure. That is, the perfluoro monovalent saturated hydrocarbon group is preferably a linear perfluoroalkyl group. The number of carbon atoms in the perfluoro monovalent saturated hydrocarbon group is preferably from 1 to 20, more preferably from 1 to 16, and in view of availability, it is further preferably from 1 to 3, and most preferably from 1 to 2.

As specific examples of the perfluoro monovalent saturated hydrocarbon group, the following groups may be mentioned, and $CF_3(CF_2)_m$— is preferred.

$CF_3(CF_2)_m$—,
$C_y^F$—$(CF_2)_n$—, and
$A_d^F$-$(CF_2)_n$—.

wherein m is an integer of from 0 to 19, preferably an integer of from 0 to 15, particularly preferably an integer of from 0 to 6, $C_y^F$ is a perfluorocyclohexyl-group, $A_d^F$ is a perfluoroadamantyl group, and n is an integer of from 0 to 15.

In this specification, a perfluoro monovalent saturated hydrocarbon group having an etheric oxygen atom inserted between carbon atoms is a group having an etheric oxygen atom inserted between carbon atoms in the above perfluoro monovalent saturated hydrocarbon group. In the perfluoro monovalent saturated hydrocarbon group, no —$OCF_2O$— structure is present. "No —$OCF_2O$— structure is present" means that presence of the structure cannot be detected by a conventional analysis means (such as $^{19}$F-NMR). In a case where an etheric oxygen atom is inserted between carbon atoms, the number of oxygen atoms inserted is preferably from 1 to 7, more preferably from 1 to 4. The position where the oxygen atom is inserted is in the single bond of carbon atoms, and the number of carbon atoms between oxygen atoms is at least 2.

<Compound (A)>

The compound (A) is a compound represented by the following formula.

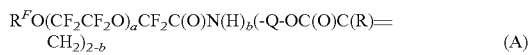
(A)

a is the number of the —(CF$_2$CF$_2$O)— unit, and is an integer of from 1 to 200, preferably an integer of from 2 to 100, more preferably an integer of from 3 to 50, particularly preferably an integer of from 5 to 25.

b is 0 or 1. b is preferably 1.

Q is a C$_{1-6}$ alkylene group or -Ph-(CF$_2$)$_c$— (wherein Ph is a 1,4-phenylene group, and c is 0 or 1). Q is preferably a C$_{1-6}$ alkylene group.

In a case where Q is an alkylene group, it is preferably a linear alkylene group. The number of carbon atoms in the alkylene group is preferably from 1 to 3. In a case where Q is a group represented by -Ph-(CF$_2$)$_c$—, c is preferably 0.

R is a hydrogen atom or a C$_{1-3}$ alkyl group. R is preferably a hydrogen atom or a methyl group.

R$^F$ is preferably a C$_{1-20}$ perfluoroalkyl group, more preferably a C$_{1-16}$ perfluoroalkyl group, particularly preferably a C$_{1-4}$ perfluoroalkyl group. Further, R$^F$ is preferably a linear group.

R$^F$ is preferably CF$_3$(CF$_2$)$_m$—, more preferably CF$_3$—, CF$_3$CF$_2$—, CF$_3$(CF$_2$)$_2$— or CF$_3$(CF$_2$)$_5$—. R$^F$ is preferably CF$_3$(CF$_2$)$_5$— in view of the water/oil repellency, and is preferably CF$_3$— or CF$_3$CF$_2$— in view of the yield in direct liquid phase fluorination as one of steps for production of the compound (A).

The compound (A) is a compound having no —OCF$_2$O— structure. By having no —OCF$_2$O— structure, it is excellent in the deterioration resistance even when it is left under high temperature conditions in the presence of an acid catalyst. Accordingly, in a case where R$^F$ is a group having an etheric oxygen atom, it is preferred to design the structure so that the structure at het bond terminal moiety of R$^F$ will not be —OCF$_2$O—.

The compound (A) may be one compound or may be a mixture of two or more compounds. The mixture may be a mixture containing at least two compounds differing in R$^F$ or a. The average of a in the mixture is preferably from 5 to 20.

The molecular weight of the compound (A) is preferably from 600 to 2,500, more preferably from 800 to 1,500.

In a case where the compound (A) is a mixture of at least two compounds, the number average molecular weight of the compound (A) is preferably from 600 to 2,500, more preferably from 800 to 1,500. In a case where the compound (A) is a mixture of at least two compounds, the molecular weight distribution (Mw/Mn) of the compound (A) is preferably from 1.05 to 1.3, more preferably from 1.05 to 1.15.

When the molecular weight and the molecular weight distribution of the compound (A) are within such ranges, the viscosity of the compound (A) is low, the volatile component will be little, and the uniformity will be excellent when the compound (A) is dissolved in a solvent. The number average molecular weight and the molecular weight distribution of the compound (A) can be measured by gel permeation chromatography Specific examples of the compound (A) will be shown below.

CF$_3$O(CF$_2$CF$_2$O)$_a$CF$_2$C(O)NH(CH$_2$CH$_2$OC(O)CH=CH$_2$),
CF$_3$O(CF$_2$CF$_2$O)$_a$CF$_2$C(O)NH(CH$_2$CH$_2$OC(O)C(CH$_3$)=CH$_2$),
CF$_3$O(CF$_2$CF$_2$O)$_a$CF$_2$C(O)N(CH$_2$CH$_2$OC(O)CH=CH$_2$)$_2$,
CF$_3$O(CF$_2$CF$_2$O)$_a$CF$_2$C(O)N(CH$_2$CH$_2$OC(O)C(CH$_3$)=CH$_2$)$_2$,
CF$_3$O(CF$_2$CF$_2$O)$_a$CF$_2$C(O)NH(PhOC(O)CH=CH$_2$),
CF$_3$O(CF$_2$CF$_2$O)$_a$CF$_2$C(O)NH(PhOC(O)C(CH$_3$)=CH$_2$),
CF$_3$O(CF$_2$CF$_2$O)$_a$CF$_2$C(O)N(PhOC(O)CH=CH$_2$)$_2$, and
CF$_3$O(CF$_2$CF$_2$O)$_a$CF$_2$C(O)N(PhOC(O)C(CH$_3$)=CH$_2$)$_2$.

(Process for Producing Compound (A))

The compound (A) can be produced by the following steps (a) to (f).

In the formulae, R$^1$ is the same group as R$^F$, or a group having some or all of fluorine atoms in R$^F$ substituted by hydrogen atoms, and is preferably an alkyl group or an alkyl group having an etheric oxygen atom inserted between carbon atoms. R$^b$ is a monovalent perfluoro organic group, and is preferably a perfluoroalkyl group or a perfluoroalkyl group having an etheric oxygen atom inserted between carbon atoms. R$^c$ is an alkyl group. The other symbols are the same as those in the compound (A), and preferred embodiments thereof are also the same.

Step (a): a step of reacting compound (D1) and compound (D2) to obtain compound (D3).

As compound (D1), a mixture of at least two compounds differing in the number of a is readily available. In a case where compound (D1) is a mixture, the compound obtainable subsequent to step (a) will also be a mixture of at least two compounds differing in the number of —(CH$_2$CH$_2$O)— units.

Compound (D1) can readily be prepared by ring-opening polymerization of ethylene oxide to R$^1$OH.

Instead of compound (D2), a perfluorinated acid chloride or a perfluorinated compound which will be reacted with an alcohol to form an ester bond may be used.

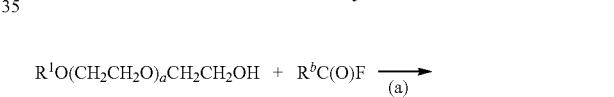
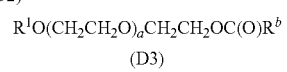

Step (b): a step of perfluorinating compound (D3) to obtain compound (D4).

The perfluorination may, for example, be a direct liquid phase fluorination wherein a fluorine gas is introduced into the liquid phase for the reaction.

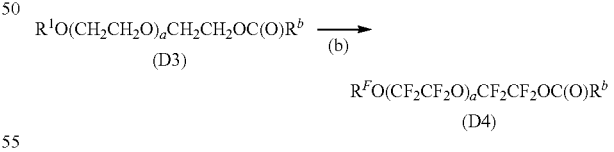

Step (c): a step of carrying out a decomposition reaction of the ester bond in compound (D4) to obtain compound (D5).

The decomposition reaction is carried out preferably in the presence of cesium fluoride, potassium fluoride or sodium fluoride.

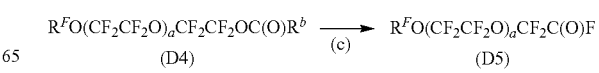

Step (d): a step of carrying out an esterification reaction of compound (D5) with compound (D6) to obtain compound (D7).

The esterification reaction may be carried out in accordance with a known method (e.g. a method disclosed in U.S. Pat. No. 3,810,874).

Further, compound (D7) may be obtained also by an ester-exchange reaction of compound (D4) with compound (D6).

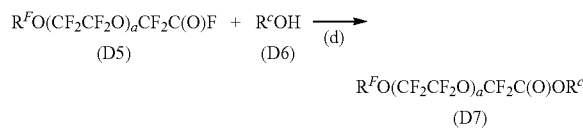

Step (e): a step of carrying out an ester-amide exchange reaction of compound (D7) with compound (D8) to obtain compound (D9).

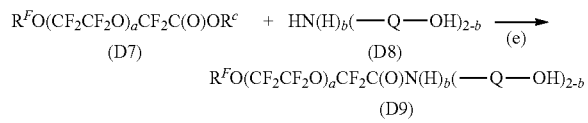

Step (f): a step of dropwise adding compound (D10) together with an amine to compound (D9) thereby to obtain compound (A).

As the amine, it is preferred to use triethylamine or pyridine.

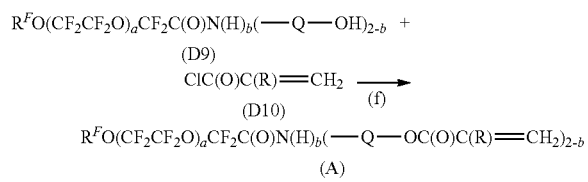

Compounds (D1), (D2), (D6), (D8) and (D10) are known compounds or compounds available from known compounds by known production methods.

<Surface Treating Agent>

In the present invention, the surface treating agent may be an agent consisting solely of the compound (A) or an agent comprising the compound (A) and a component other than the compound (A), and is an agent to be used for surface treatment. The surface treating agent contains no organic solvent.

The compound (A) is a compound useful by itself as e.g. a surface treating agent (such as a lubricant, an anti-fouling agent, a water/oil repellent, a finger print-removing property-imparting agent, a cleaning efficiency-imparting agent, a release agent or a surface modifier), and it forms a strong polymer by heat or light (e.g. ultraviolet rays or visible rays), whereby the surface treating effect can be prolonged.

Further, the compound (A) of the present invention, which has no —OCF$_2$O— structure, is capable of forming a coating film excellent in the deterioration resistance even when it is left under high temperature conditions in the presence of an acid catalyst. Further, it has a perfluoropolyether group and thus is capable of forming a coating film excellent in the water/oil repellency and the smoothness.

Further, the (CF$_2$CF$_2$O)$_a$ structure in the compound (A) is an alkyleneoxy structure having no CF$_3$ group which decreases the mobility of the molecules. Accordingly, mobility of molecules of the compound (A) itself will be high, and a coating film formed from such a compound can be a coating film excellent in the efficiency for removal of oil-and-fat stains.

Further, since the compound (A) has an amide bond, it is capable of forming a coating film excellent in the alkali resistance. Further, since the amide bond accelerates pre-alignment after dip coating, the water/oil repellency after the polymerization can be improved. That is, the amide bond is withdrawn by an object to be coated (particularly a metal material) due to its polarity, whereby the perfluoropolyether groups are aligned in the surface direction, and an ideal low surface energy can be realized.

The surface treating agent of the present invention may contain components other than the compound (A). Such other components may, for example, be additives.

(Additives)

As additives, those to be added for the purpose of increasing the durability of the coating film formed form the surface treating agent, the durability of functions, etc., are preferred, and a silica sol, a superfine particulate metal oxide (such as aluminum oxide, magnesium oxide or zirconium oxide) or various resins (such as an epoxy resin, an unsaturated polyester resin or a polyurethane resin) may, for example, be mentioned.

As an additive to be added for the purpose of improving the efficiency for forming the coating film, a surfactant may, for example, be mentioned. The amount of the surfactant to be added is preferably from 0.01 to 5 mass % based on the total mass of the composition.

As an additive to accelerate curing, in a case where the surface treating agent is heat-cured, a heat-curing accelerator may be used, and in a case where the surface treating agent is photo-cured, a photopolymerization initiator may be used. The heat-curing accelerator may, for example, be a peroxide such as benzoyl peroxide, di-tert-butyl peroxide, dicumyl peroxide, tert-butyl hydroperoxide or cumene hydroperoxide or an azo compound such as azobisisobutyronitrile. The photopolymerization initiator may, for example, be an acetophenone photopolymerization initiator, a benzoin ether photopolymerization initiator, a benzyl ketal photopolymerization initiator, or a ketone polymerization initiator such as benzophenone or benzyl. The amount of the additive to accelerate the curing is preferably from 0.01 to 5 mass % based on the total mass of the composition.

The additives may be used alone or in combination of two or more.

<Composition for Surface Treatment>

In the present invention, the composition for surface treatment is a composition comprising the compound (A) and an organic solvent, to be used for surface treatment.

The composition for surface treatment in the present invention comprises the compound (A) and an organic solvent as essential components, but may contain a component other than the compound (A) and the organic solvent. Such other component may be additives.

(Organic Solvent)

The state of the composition for surface treatment of the present invention containing the organic solvent may be any one of a solution, a suspension and an emulsion and is preferably a solution.

The organic solvent may be a fluorinated organic solvent or a non-fluorinated organic solvent, and is preferably a fluorinated organic solvent in view of nonflammability thus leading to safety, and with a view to forming a uniform film with a low surface tension and with little unevenness in the film thickness.

For example, the fluorinated organic solvent may, for example, be a perfluoroamine (such as perfluorotripropylamine or perfluorotributylamine) or a perfluoroalkane (Vertrel (manufactured by Du Pont)). The fluorinated organic solvent is preferably a fluorinated ether with high solubility and light environmental burden, and particularly preferably $CF_3CH_2OCF_2CF_2H$ (manufactured by Asahi Glass Company, Limited, product name: AE-3000) in view of the boiling point and the solubility. Such a solvent has a boiling point suitable for coating (e.g. coating in a dip coating step).

The non-fluorinated organic solvent may, for example, be a hydrocarbon, an alcohol, a ketone, an ether, an ester or a chlorinated hydrocarbon.

The organic solvents may be used alone or as a mixed solvent of at least two. In a case where the mixed solvent has an azeotropic composition, such a composition is preferably employed.

The composition for surface treatment containing the organic solvent preferably contains the compound (A) in an amount of from 0.01 to 50 parts by mass per 100 parts by mass of the organic solvent.

(Additives)

The composition for surface treatment of the present invention may contain additives.

The additives may be the same as the above-described additives which may be used for the surface treating agent.

<Applications>

The surface treating agent and the composition for surface treatment (hereinafter referred to as the surface treating agent and the like) of the present invention may be applied to a surface modifier to change the feature of a substrate surface by treatment such as application to the substrate surface, an antireflection film for resists, etc. Further, the surface treating agent and the like of the present invention may be used as it is or may be used as an additive to another surface treating agent. In a case where it is used as an additive, its amount is preferably such that the amount of the compound (A) is within a range of from 0.01 to 5 parts by mass to the total mass (100 parts by mass) of another surface treating agent.

The surface modifier may be a surface modifier such as a lubricant, an anti-fouling agent, a water/oil repellent, a finger print-removing property-imparting agent, a cleaning-efficiency-imparting agent, a release property-imparting agent or a wire-covering material.

The coating film formed from the surface treating agent and the like of the present invention is excellent in the water/oil repellency, the efficiency for removal of oil-and-fat stains, alkali resistance and heat resistance and lowers the coefficient of friction. Accordingly, the surface treating agent and the like of the present invention is useful as an antireflection property or finger print-removing property-imparting agent for an optical member.

The above-described surface treating agent and the like of the present invention contains the compound (A) as an essential component and is thereby capable of forming a coating film excellent in the water/oil repellency, the efficiency for removal of oil-and-fat stains, alkali resistance and heat resistance and having a low coefficient of friction.

<Article>

The article of the present invention is an article having a coating film formed by applying the surface treating agent of the present invention on the surface of a substrate and curing the surface treating agent.

Otherwise, the article of the present invention is an article having a coating film formed by applying the composition for surface treatment of the present invention on the surface of a substrate, drying the organic solvent and curing the composition.

The material of the substrate may, for example, be glass, stone material, a metal or a resin.

In a case where the surface treating agent and the like of the present invention is used as a finger print-removing property-imparting agent, it is preferably a transparent substrate, and it is preferably made of glass, a polycarbonate, a polystyrene or a polyacrylate.

In the case of an optical application, the substrate is preferably a transparent substrate, and is preferably made of glass or a polycarbonate.

In the case of the application as a release property-imparting-agent, the substrate is preferably a metal substrate or a silicone.

The metal substrate is preferably made of stainless steel or nickel.

The coating method may, for example, be a roll coating method, a casting method, a dip coating method, a spin coating method, a spray coating method, a flow coating method, a squeegee coating method, a casting-on-water method, a die coating method, a Langmuir-Blodgett method or a vacuum vapor deposition method. A spin coating method, a dip coating method or a vacuum vapor deposition method is preferred, since it is thereby possible to form a uniform coating film, and a spray coating method, a flow coating method, a squeegee coating method or a die coating method is preferred for mass production. In a case where coating is carried out by a spin coating method or a dip coating method, it is preferred to employ a composition containing an organic solvent.

In a case where the surface treating agent and the like is a composition for surface treatment containing an organic solvent, it is preferred to select, as the organic solvent, an organic solvent having a boiling point suitable for the coating method.

The concentrations of the compound (A) and other components in the composition containing the organic solvent are preferably adjusted depending upon the thickness of the coating film. For example, the amount of the compound (A) and other components in the total mass (100 mass %) of the composition containing the organic solvent is preferably from 1.5 to 3.0 parts by mass, when a coating film having a thickness of 250 nm is to be formed.

The coating with the surface treating agent and the like may be carried out after pretreatment of the surface of the substrate is carried out. The method for such pretreatment may, for example, be an acid treatment with e.g. hydrofluoric acid or hydrochloric acid; an alkali treatment with e.g. an aqueous sodium hydroxide solution or an aqueous potassium hydroxide solution; or a polishing treatment with e.g. cerium fluoride or cerium oxide.

The surface treating agent and the like applied on the substrate is cured by heat or light. In the case of heat curing, curing is carried out preferably at from 100 to 150° C. so that the substrate will not be deteriorated during curing. In the case of photo-curing, curing is carried out preferably at room temperature over a period of from 5 to 10 minutes. Photo-curing is more preferred since the substrate can be selected without considering the heat resistance of the substrate. Further, in the case of photo-curing, the surface treating agent and the like of the present invention is cured without use of a curing agent, whereby a coating film without remaining of the curing agent can be formed.

A coating film formed by using the surface treating agent and the like is a strong coating film and has high adhesion to the substrate. Further, the coating film is excellent in the transparency, has a low refractive index and is excellent in the heat resistance and the chemical resistance. The thickness of the coating film is preferably from 0.001 to 50 µm. According to the surface treating agent and the like of the present invention, a monomolecular film can be formed.

Specific examples of an article having the coating film include a transparent optical member (such as a lens), a mold (such as a mold for imprinting), a semiconductor metal wiring (such as gold wiring) and a display member (such as a touch panel).

The compound (A) of the present invention may be applied to, in addition to the surface treating agent, an adhesive for a semiconductor element, additives for various materials, etc.

The above-described article of the present invention has a coating film excellent in the water/oil repellency, the efficiency for removal of oil-and-fat stains, alkali resistance and heat resistance and having a low coefficient of friction, since the coating film is formed on the surface of a substrate by using the surface treating agent and the like of the present invention.

EXAMPLES

Now, the present invention will be described in detail with reference to Examples. However, it should be understood that the present invention is by no means restricted to such specific Examples.

Examples 1, 3 and 6 are Examples of the present invention, and Examples 2, 4, 5 and 7 are Comparative Examples.
Abbreviations
  TMS: Tetramethylsilane,
  R-113: $CCl_2FCClF_2$,
  R-225: dichloropentafluoropropane,
  L: Liter, and
  $R^f$: —$CF(CF_3)OCF_2CF(CF_3)OCF_2CF_2CF_3$.
Contact Angle On the surface of a coating film of an article, five droplets of water or hexadecane of about 2 µL were placed, and their contact angles were measured, and an average value of the five values was obtained.
Water Sliding Angle An article was held horizontally, and on the surface of a coating film of the article, a water droplet of 50 µL was dropped, and then the article was gradually inclined, and the angle (sliding angle) between the article and the horizontal plane when the droplet started to slide, was measured. The smaller the sliding angle, the better the water droplet sliding property.
Alkali Resistance An article was immersed in an aqueous sodium hydroxide solution of pH 13 for two hours or 24 hours. The article was washed with water and dried, and then the water contact angle and the water sliding angle of the surface of a coating film of the article were measured.
Abrasion Resistance Using a rotating friction tester (manufactured by HEIDON), the coefficient of friction of the surface of a coating film of an article was measured under conditions of a load of 100 g at 500 revolutions per minute.
Efficiency for Removal of Oil-and-Fat Stains On the surface of a coating film of an article, oil-and-fat stains were artificially formed by oleic acid and then wiped once with a cellulose non-woven fabric (BEMCOT M-3, manufactured by Asahi Kasei Corporation) while a load of 100 g was applied to 4 $cm^2$, whereby efficiency for removal of the oil-and-fat stains was visually judged. The standards for judgment were as follows.

○ (good): The oil-and-fat stains can be completely wiped off.

Δ (acceptable): Wiping trace of the oil-and-fat stains remains.

x (insufficient): The oil-and-fat stains cannot be wiped off.

Example 1

Example 1-1

Preparation of Compound (D3-1)

Into a 500 mL flask, 25 g of the following compound (D1-1) (commercially available polyoxyethylene glycol monomethyl ether, average value of a: 7.3), 20 g of R-225 and 1.2 g of sodium fluoride were put and vigorously stirred while maintaining the internal temperature to be at most 10° C., and nitrogen gas was bubbled. Into the flask, 46.6 g of the following compound (D2-1) was dropwise added over a period of 3.0 hours while maintaining the internal temperature to be at most 5° C. After completion of the dropwise addition, the mixture was stirred at 50° C. for 12 hours and at room temperature for 24 hours, whereupon a crude liquid was recovered. The crude liquid was subjected to filtration under reduced pressure, whereupon the recovered liquid was dried for 12 hours in a vacuum drier (50° C., 667 Pa) to obtain a crude liquid. The crude liquid was dissolved in 100 mL of R-225 and washed three times with 1,000 mL of a saturated sodium hydrogen carbonate aqueous solution to recover an organic phase. To the organic phase, 1.0 g of magnesium sulfate was added, followed by stirring for 12 hours, whereupon magnesium sulfate was removed by filtration under pressure. From the recovered liquid, R-225 was distilled off by an evaporator to obtain 56.1 g of a compound which was liquid at room temperature. From the results of the NMR analysis of the compound, it was confirmed to be the following compound (D3-1) (average value of a in Example: 7.3).

$CH_3O(CH_2CH_2O)_aCH_2CH_2OH$ (D1-1),

$FC(O)R^f$ (D2-1),

$CH_3O(CH_2CH_2O)_aCH_2CH_2OC(O)R^f$ (D3-1).

H-NMR spectrum of compound (D3-1):
$^1$H-NMR (300.4 MHz, solvent: $CDCl_3$, standard: TMS) δ (ppm): 4.2, 4.35, 4.4, 4.75
$^{19}$F-NMR (282.7 MHz, solvent: $CDCl_3$, standard: $CFCl_3$) δ (ppm): −79.5, −80.0, −82.5 to −85.0, −128.0 to −129.2, −131.5, −144.5

Example 1-2

Preparation of Compound (D4-1)

Into a 3,000 mL hastelloy autoclave, 1,560 g of R-113 was put, stirred and maintained at 25° C. At a gas outlet of the autoclave, a condenser held at 20° C., a sodium fluoride pellet-packed layer and a condenser held at −20° C. were connected in series. Further, a liquid-returning line was installed to return a liquid condensed by the condenser held at −20° C. to the autoclave.

Into the autoclave, nitrogen gas was supplied for 1.0 hour, and then, fluorine gas diluted to 10% by nitrogen gas (hereinafter referred to as 10% fluorine gas) was supplied for one hour at a flow rate of 24.8 L/hr. Then, into the autoclave, while supplying 10% fluorine gas at the same flow rate, a solution having 27.5 g of the compound (D3-1) dissolved in 1,350 g of R-113 was injected over a period of 30 hours. Then, into the autoclave, while supplying 10% fluorine gas at the same flow rate, 12 mL of R-113 was injected. At that time, the internal temperature was changed to 40° C. Then, 6 mL of a R-113 solution having 1 mass % of benzene dissolved, was injected. Further, fluorine gas was supplied for 1.0 hour and then, nitrogen gas was supplied for 1.0 hour.

After completion of the reaction, the solvent was distilled off by vacuum drying (60° C., 6.0 hours) to obtain 45.4 g of a compound which was liquid at room temperature. From the results of the NMR analysis of the compound, it was confirmed that the following compound (D4-1) having 99.9% of the total number of hydrogen atoms in the compound (D3-1) substituted by fluorine atoms, was the main component.

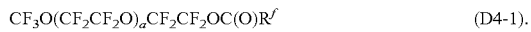

CF$_3$O(CF$_2$CF$_2$O)$_a$CF$_2$CF$_2$OC(O)R$^f$ (D4-1).

NMR spectrum of compound (D4-1):
$^1$H-NMR (300.4 MHz, solvent: R-113, standard: TMS, internal standard: nitrobenzene) δ (ppm): 5.9 to 6.4
$^{19}$F-NMR (282.7 MHz, solvent: R-113, standard: CFCl$_3$, internal standard: hexafluorobenzene) δ (ppm): 12.7, −54.9, −77.5 to −80.0, −81.5, −82.2, −84.5, −87.5, −89.7, −129, −131.5, −135.0 to −139.0, −144.5

Example 1-3

Preparation of Compound (D5-1)

A 50 mL egg-plant type flask having stirrer chips put therein, was thoroughly flushed with nitrogen gas. Into the egg-plant type flask, 5.0 g of 1,1,3,4-tetrachlorohexafluorobutane, 0.05 g of potassium fluoride and 2.0 g of the compound (D4-1) were put, vigorously stirred and maintained at 120° C. At an outlet of the egg-plant type flask, a condenser held at 20° C. and a dry ice/ethanol condenser were connected in series, and the outlet of the egg-plant type flask was sealed with nitrogen gas.

Eight hours later, the internal temperature of the egg-plant type flask was lowered to room temperature, then a vacuum pump was installed to the condenser tube to maintain the interior of the system under reduced pressure, and the solvent and by-products were distilled off. After three hours, 0.86 g of a compound which was liquid at room temperature, was obtained. From the results of the NMR analysis of the compound, it was found that the following compound (D5-1) having 99% of the total number of ester bonds in the compound (D4-1) substituted by fluorine atoms, was the main product.

CF$_3$O(CF$_2$CF$_2$O)$_a$CF$_2$C(O)F (D5-1).

NMR spectrum of compound (D5-1):
$^1$H-NMR (300.4 MHz, solvent: R-113, standard: TMS, internal standard: nitrobenzene) δ (ppm): 5.9 to 6.4
$^{19}$F-NMR (282.7 MHz, solvent: R-113, standard: CFCl$_3$, internal standard: hexafluorobenzene) δ (ppm): 12.7, −54.9, −78.1, −87.5, −89.7, −135.0 to −139.0

Example 1-4

Preparation (1) of Compound (D7-1)

Into a 500 mL egg-plant type flask containing 40 g of the compound (D5-1), 20.0 g of R-113 was put, followed by vigorous stirring while maintaining the internal temperature at 25° C. Into the egg-plant type flask, 20.0 g of the compound (D6-1) was slowly dropwise added, while maintaining the internal temperature to be at least 25° C.

Eight hours later, stirring was stopped, and the crude liquid was filtered under pressure to remove potassium fluoride. Then, from the recovered liquid, R-113 and excess compound (D6-1) were completely removed by an evaporator to obtain 43 g of a compound which was liquid at room temperature. From the results of the NMR analysis of the compound, it was confirmed that the following compound (D7-1) having the total number of acid fluoride in the compound (D5-1) esterified, was the main product.

HOCH$_2$CH$_3$ (D6-1),

CF$_3$O(CF$_2$CF$_2$O)$_a$CF$_2$C(O)OCH$_2$CH$_3$ (D7-1).

NMR spectrum of compound (D7-1):
$^1$H-NMR (300.4 MHz, solvent: R-113, standard: TMS, internal standard: nitrobenzene) δ (ppm): 1.27, 4.27, 5.9 to 6.4
$^{19}$F-NMR (282.7 MHz, solvent: R-113, standard: CFCl$_3$, internal standard: hexafluorobenzene) δ (ppm): −54.9, −78.5, −87.5, −89.7, −135.0 to −139.0

Example 1-5

Preparation (2) of Compound (D7-1)

A 300 mL egg-plant type flask having stirrer chips put therein, was thoroughly flushed with nitrogen gas. Into the egg-plant type flask, 40 g of the compound (D6-1), 5.6 g of sodium fluoride and 50 g of R-225 were put. Into the egg-plant type flask, 43.5 g of the compound (D4-1) was dropwise added, followed by vigorous stirring while bubbling at room temperature. The outlet of the egg-plant type flask was sealed with nitrogen gas.

Eight hours later, a vacuum pump was installed at the condenser tube to maintain the inside of the system under reduced pressure, and excess compound (D6-1) and CH$_3$CH$_2$OC(O)R$^f$ formed by ester exchange, were distilled off. After 24 hours, 26.8 g of a compound which was liquid at room temperature, was obtained. From the results of the NMR analysis of the compound, it was confirmed that the compound (D7-1) having the entire amount of ester groups in the compound (D4-1) ester-exchanged, was the main product.

NMR spectrum of compound (D7-1):
$^1$H-NMR (300.4 MHz, solvent: R-113, standard: TMS, internal standard: nitrobenzene) δ (ppm): 1.27, 4.27, 5.9 to 6.4
$^{19}$F-NMR (282.7 MHz, solvent: R-113, standard: CFCl$_3$, internal standard: hexafluorobenzene) δ (ppm): −54.9, −78.5, −87.5, −89.7, −135.0 to −139.0

Example 1-6

Preparation of Compound (D9-1)

A 300 mL egg-plant type flask having stirrer chips put therein, was thoroughly flushed with nitrogen gas. Into the egg-plant type flask, 30 g of the compound (D7-1) was put, and then while the interior of the system was maintained to be at most 5° C. by cooling with ice, a solution having 4 g of the compound (D8-1) (manufactured by KANTO CHEMICAL CO., INC., Cas: 141-43-5) diluted with 40 g of R-225 was dropwise added slowly. Then, stirring was carried out at room temperature for 12 hours, and the reaction solution was put in 300 mL of a saturated sodium hydrogen carbonate aqueous solution, followed by washing with water three times. Phase separation into two phases was carried out, and to the recovered organic phase, 1.0 g of magnesium sulfate was added, followed by stirring for 12 hours, whereupon magnesium sulfate was removed by filtration under pressure. From the recovered liquid, R-225 was distilled off by an evaporator to obtain 24.8 g of a compound which was liquid at room temperature. From the results of the NMR analysis of the compound, it was confirmed that the following compound (D9-1) having the entire amount of ester groups in the compound (D7-1) exchanged to amide groups, was the main product.

H$_2$NCH$_2$CH$_2$OH     (D8-1),

CF$_3$O(CF$_2$CF$_2$O)$_a$CF$_2$C(O)N(H)(CH$_2$CH$_2$OH)     (D9-1).

NMR spectrum of compound (D9-1):
$^1$H-NMR (300.4 MHz, solvent: R-113, standard: TMS, internal standard: nitrobenzene) δ (ppm): 2.75, 3.62, 5.9 to 6.4
$^{19}$F-NMR (282.7 MHz, solvent: R-113, standard: CFCl$_3$, internal standard: hexafluorobenzene) δ (ppm): −54.9, −79.8, −87.5, −89.7, −135.0 to −139.0

Example 1-7

Preparation of Compound (A-1)

Into a flask, 25 g of the compound (D9-1), 20 g of R-225 and 3.0 g of triethylamine (manufactured by KANTO CHEMICAL CO., INC.) were put and vigorously stirred while maintaining the internal temperature to be at most 10° C., and nitrogen gas bubbled. Into the flask, 3.0 g of the compound (D10-1) (manufactured by KANTO CHEMICAL CO., INC., Cas: 920-46-7) was dropwise added over a period of 1.0 hour while maintaining the internal temperature to be at most 5° C. After completion of the dropwise addition, the mixture was stirred at 50° C. for 12 hours and at room temperature for 24 hours, whereupon a crude liquid was recovered. Then, stirring was carried out at room temperature for 12 hours, and the reaction solution was put in 300 mL of a saturated sodium hydrogen carbonate aqueous solution, followed by washing with water three times. Phase separation into two phases was carried out, and to the recovered organic phase, 1.0 g of magnesium sulfate was added, followed by stirring for 12 hours, whereupon magnesium sulfate was removed by filtration under pressure. From the recovered liquid, R-225 was distilled off by an evaporator to obtain 24.8 g of a compound which was liquid at room temperature. From the results of the NMR analysis of the compound, it was confirmed that the following compound (A-1) having the entire amount of hydroxy groups in the compound (D9-1) derived into an ester, was the main component.

ClC(O)C(CH$_3$)=CH$_2$     (D10-1),

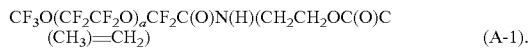

CF$_3$O(CF$_2$CF$_2$O)$_a$CF$_2$C(O)N(H)(CH$_2$CH$_2$OC(O)C(CH$_3$)=CH$_2$)     (A-1).

NMR spectrum of compound (A-1):
$^1$H-NMR (300.4 MHz, solvent: R-113, standard: TMS, internal standard: nitrobenzene) δ (ppm): 2.75, 3.29, 3.62, 6.5
$^{19}$F-NMR (282.7 MHz, solvent: R-113, standard: CFCl$_3$, internal standard: hexafluorobenzene) δ (ppm): −54.9, −79.8, −87.5, −89.7, −135.0 to −139.0

Example 2

Example 2-1

Preparation of Compound (D11-1)

A 300 mL egg-plant type flask having stirrer chips put therein, was thoroughly flushed with a nitrogen gas. Into the egg-plant type flask, 30 g of 2-propanol, 50.0 g of R-225 and 4.1 g of NaBH$_4$ were put. An outlet of the egg-plant type flask was sealed with nitrogen gas. 26.2 g of the compound (D7-1) was diluted with 30 g of R-225 and dropwise added, followed by vigorous stirring at room temperature.

Eight hours later, a vacuum pump was installed at the condenser tube to maintain the inside of the system under reduced pressure, and the solvent was distilled off. After 24 hours, 100 g of R-225 was put into the egg-plant type flask, and with stirring, 500 g of a 0.2 mol/L hydrochloric acid aqueous solution was dropwise added. After the dropwise addition, stirring was continued for 6 hours. The organic phase was washed three times with 500 g of distilled water, followed by phase separation into two phases, whereupon the organic phase was recovered. To the organic phase, 1.0 g of magnesium sulfate was added, followed by stirring for 12 hours, whereupon magnesium sulfate was removed by filtration under pressure. From the recovered liquid, R-225 was distilled off by an evaporator to obtain 24.8 g of a compound which was liquid at room temperature. From the results of the NMR analysis of the compound, it was confirmed that the following compound (D11-1) having the entire amount of ester groups in the compound (D7-1) reduced, was the main product.

CF$_3$O(CF$_2$CF$_2$O)$_a$CF$_2$CH$_2$OH     (D11-1).

NMR spectrum of compound (D11-1):
$^1$H-NMR (300.4 MHz, solvent: R-113, standard: TMS, internal standard: nitrobenzene) δ (ppm): 2.6, 3.92, 5.9 to 6.4
$^{19}$F-NMR (282.7 MHz, solvent: R-113, standard: CFCl$_3$, internal standard: hexafluorobenzene) δ (ppm): −54.9, −79.8, −87.5, −89.7, −135.0 to −139.0

Example 2-2

Preparation of Compound (B-1)

Into a 500 mL flask, 25 g of the compound (D11-1), 20 g of R-225 and 3.0 g of triethylamine (manufactured by KANTO CHEMICAL CO., INC.) were put and vigorously stirred while maintaining the internal temperature to be at most 10° C., and nitrogen gas was bubbled. Into the flask, 3.0 g of the compound (D10-1) was dropwise added over a period of 1.0 hour while maintaining the internal temperature to be at most 5° C. After completion of the dropwise addition, the mixture was stirred at 50° C. for 12 hours and at room temperature for 24 hours, whereupon a crude liquid was recovered. Then, stirring at room temperature was carried out for 12 hours, and the reaction solution was put into 300 mL of a saturated sodium hydrogen carbonate aqueous solution, followed by washing with water three times. Phase separation into two phases was carried out, and to the recovered organic phase, 1.0 g of magnesium sulfate was added, followed by stirring for 12 hours, whereupon magnesium sulfate was removed by filtration under pressure. From the recovered liquid, R-225 was distilled off by an evaporator to obtain 24.8 g of a compound which was liquid at room temperature. From the results of the NMR analysis of the compound, it was confirmed that the following compound (B-1) having the entire amount of hydroxy groups in the compound (D11-1) derived into ester was the main product.

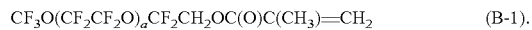

CF$_3$O(CF$_2$CF$_2$O)$_a$CF$_2$CH$_2$OC(O)C(CH$_3$)=CH$_2$     (B-1).

NMR spectrum of compound (B-1):
$^1$H-NMR (300.4 MHz, solvent: R-113, standard: TMS, internal standard: nitrobenzene) δ (ppm): 3.29, 3.83, 6.5

$^{19}$F-NMR (282.7 MHz, solvent: R-113, standard: CFCl$_3$, internal standard: hexafluorobenzene) δ (ppm): −54.9, −79.8, −87.5, −89.7, −135.0 to −139.0

Example 3

The compound (A-1) was diluted with R-225 to obtain a 0.05 mass % R-225 solution, and the solution was put in a dip coating bath. While adjusting the temperature in the apparatus to be 20° C., a test disk (diameter: 2.5 inches) was dipped for 30 seconds, and lifted at a constant rate of 6 mm/sec using a lifter. The solvent was evaporated at room temperature, and by using an ultraviolet irradiating apparatus (manufactured by UVP, UV CrossLinker CX-2000), the test disk coated with the compound (A-1) was irradiated with ultraviolet rays to form a coating film. The wavelength of the ultraviolet rays was a mixed wavelength of 184 nm and 253 nm, and the irradiation time was 15 seconds. The test disk having a coating film formed thereon was dipped in R-225 for 30 seconds for cleaning.

With respect to the disk after cleaning, the initial contact angle and water sliding angle were measured, and then the alkali resistance was evaluated. The results are shown in Tables 1 and 2.

Further, with respect to a disk prepared in the same manner, the coefficient of friction was measured. Further, the efficiency for removal of oil-and-fat stains was evaluated. The results are shown in Table 3.

As the test disk as a substrate, three types i.e. substrate disks for HDD (made of glass and made of aluminum) and a disk for CD (made of polycarbonate (PC)) were used.

Example 4

Disks were prepared in the same manner as in Example 3 except that the compound (A-1) was changed to the compound (B-1), and measurements and evaluations were carried out. The results are shown in Tables 1 to 3.

Example 5

Disks were prepared in the same manner as in Example 3 except that the compound (A-1) was changed to the following compound (C-1) (manufactured by Asahi Glass Company, Limited, FA-X), and measurements and evaluations were carried out. The results are shown in Tables 1 to 3.

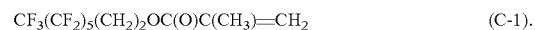

$$CF_3(CF_2)_5(CH_2)_2OC(O)C(CH_3)=CH_2 \qquad (C-1).$$

TABLE 1

| Glass substrate | Compound | Contact angle (degree) Water | Contact angle (degree) Hexadecane | Water sliding angle (degree) | Alkali resistance (2 hours) Water contact angle (degree) | Alkali resistance (2 hours) Water sliding angle (degree) | Alkali resistance (24 hours) Water contact angle (degree) | Alkali resistance (24 hours) Water sliding angle (degree) |
|---|---|---|---|---|---|---|---|---|
| Substrate alone | — | 23 | 17 | >30 | 22 | >30 | 20 | >30 |
| Example 3 | A-1 | 112 | 65 | 18 | 109 | 19 | 100 | 21 |
| Example 4 | B-1 | 107 | 63 | 19 | 105 | 20 | 50 | >30 |
| Example 5 | C-1 | 116 | 68 | 17 | 107 | 18 | 85 | 24 |

TABLE 2

| Aluminum substrate | Compound | Contact angle (degree) Water | Contact angle (degree) Hexadecane | Water sliding angle (degree) | Alkali resistance (2 hours) Water contact angle (degree) | Alkali resistance (2 hours) Water sliding angle (degree) | Alkali resistance (24 hours) Water contact angle (degree) | Alkali resistance (24 hours) Water sliding angle (degree) |
|---|---|---|---|---|---|---|---|---|
| Substrate alone | — | 24 | 18 | >30 | 24 | >30 | 20 | >30 |
| Example 3 | A-1 | 119 | 64 | 11 | 118 | 12 | 103 | 18 |
| Example 4 | B-1 | 111 | 63 | 13 | 108 | 15 | 45 | >30 |
| Example 5 | C-1 | 115 | 67 | 10 | 102 | 15 | 70 | 22 |

TABLE 3

| | Compound | Coefficient of friction Glass substrate | Coefficient of friction Aluminum substrate | Coefficient of friction PC substrate | Efficiency for removal of oil-and-fat stains Glass substrate | Efficiency for removal of oil-and-fat stains Aluminum substrate | Efficiency for removal of oil-and-fat stains PC substrate |
|---|---|---|---|---|---|---|---|
| Substrate alone | — | 1.23 | 1.42 | 2.52 | x | x | x |
| Example 3 | A-1 | 0.48 | 0.31 | 0.58 | ○ | ○ | ○ |
| Example 4 | B-1 | 0.50 | 0.49 | 0.61 | ○ | Δ | Δ |
| Example 5 | C-1 | 8.79 | 9.91 | 1.84 | x | x | x |

The coating film formed from the compound (A-1) had high water/oil repellency, good alkali resistance (2 hours, 24 hours), a low coefficient of friction and good efficiency for removal of oil-and-fat stains. However, the coating film formed from the compound (B-1) was inferior in the alkali resistance (24 hours) and had remarkably deteriorated water/oil repellency. It was considered that hydrolysis at the moiety of the ester linkage occurred by the alkali.

The coating film formed from the compound (C-1) was inferior in the alkali resistance (24 hours), had a high coefficient of friction and had insufficient efficiency for removal of oil-and-fat stains.

Example 6

A stability test was carried out by a method wherein by raising the temperature from 25° C. to 500° C. at a rate of 10° C./min in a nitrogen gas atmosphere (100 mL/min), the mass decrease of 25 mg of the compound (A1-1) was measured by a differential thermobalance. As a result, no mass decrease was observed, and the mass was substantially constant.

In the presence of 0.5 g of fine powder of γ-alumina (N-611N, manufactured by Nikki Chemical Co., Ltd) as an acid catalyst, the stability test of 25 mg of the compound (A-1) was carried out. As a result, the mass reduction profile was the same as in the case where no acid catalyst was present, thus showing excellent stability.

Example 7

Using a known perfluoropolyether (FOMBLIN Z DiOL4000, manufactured by Ausimont K.K.) a stability test was carried out in the same manner. As a result, the ether was instantaneously decomposed in the entire amount at 250° C. in the presence of the fine powder of γ-alumina and vaporized as converted to low molecular weight compounds.

INDUSTRIAL APPLICABILITY

The surface treating agent of the present invention is useful as a surface treating agent to present a lubricant, an anti-fouling agent, a water/oil repellent, a finger print-removing property-imparting agent, a cleaning efficiency-imparting agent, a release agent, a surface modifier or the like.

This application is a continuation of PCT Application No. PCT/JP2010/060495 filed on Jun. 21, 2010, which is based upon and claims the benefit of priority from Japanese Patent Application No. 2009-155563 filed on Jun. 30, 2009. The contents of those applications are incorporated herein by reference in its entirety.

What is claimed is:

1. A surface treating agent comprising a compound (A) represented by the following formula (A):

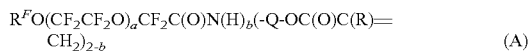
(A)

wherein $R^F$ is a $C_{1-20}$ perfluoro monovalent saturated hydrocarbon group or a $C_{2-20}$ perfluoro monovalent saturated hydrocarbon group having an etheric oxygen atom inserted between carbon atoms, and is a group having no —$OCF_2O$— structure,
a is an integer of from 1 to 200,
b is 0 or 1,
Q is a $C_{1-6}$ alkylene group or -Ph-$(CH_2)_c$— (wherein Ph is a 1,4-phenylene group, and c is 0 or 1), and
R is a hydrogen atom or a $C_{1-3}$ alkyl group.

2. A composition for surface treatment comprising a compound (A) represented by the following formula (A) and an organic solvent:

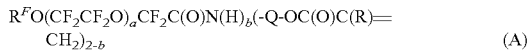
(A)

wherein $R^F$ is a $C_{1-20}$ perfluoro monovalent saturated hydrocarbon group or a $C_{2-20}$ perfluoro monovalent saturated hydrocarbon group having an etheric oxygen atom inserted between carbon atoms, and is a group having no —$OCF_2O$— structure,
a is an integer of from 1 to 200,
b is 0 or 1,
Q is a $C_{1-6}$ alkylene group or -Ph-$(CH_2)_c$— (wherein Ph is a 1,4-phenylene group, and c is 0 or 1), and
R is a hydrogen atom or a $C_{1-3}$ alkyl group.

3. The composition for surface treatment according to claim 2, wherein the organic solvent contains comprises a fluorinated organic solvent.

4. The composition for surface treatment according to claim 2, which comprises the compound (A) in an amount of from 0.001 to 50 parts by mass per 100 parts by mass of the organic solvent.

5. A method for treating the surface of an article, which comprises applying the surface treating agent as defined in claim 1 on the surface of a substrate, and curing the compound (A) to form a coating film.

6. The method for treating the surface according to claim 5, wherein the substrate is a transparent substrate.

7. The method for treating the surface according to claim 6, wherein the material of the transparent substrate is glass or a polycarbonate.

8. The method for treating the surface according to claim 5, wherein a finger print-removing property is imparted to the surface of the substrate.

9. An article having a coating film formed by applying the surface treating agent as defined in claim 1 on the surface of a substrate and curing the compound (A).

10. The article according to claim 9, wherein the substrate is a transparent substrate.

11. The article according to claim 10, wherein the material of the transparent substrate is glass or a polycarbonate.

12. The article according to claim 9, of which the surface has a finger print-removing property.

13. A compound represented by the following formula (A):

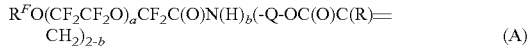
(A)

wherein $R^F$ is a $C_{1-20}$ perfluoro monovalent saturated hydrocarbon group or a $C_{2-20}$ perfluoro monovalent saturated hydrocarbon group having an etheric oxygen atom inserted between carbon atoms, and is a group having no —$OCF_2O$— structure,
a is an integer of from 1 to 200,
b is 0 or 1,
Q is a $C_{1-6}$ alkylene group or -Ph-$(CH_2)_c$— (wherein Ph is a 1,4-phenylene group, and c is 0 or 1), and
R is a hydrogen atom or a $C_{1-3}$ alkyl group.

14. A method for treating the surface of an article, which comprises applying a composition for surface treatment as defined in claim 2 on the surface of a substrate, drying the organic solvent, and curing the compound (A) to form a coating film.

15. The method for treating the surface according to claim 14, wherein the substrate is a transparent substrate.

16. The method for treating the surface according to claim 15, wherein the material of the transparent substrate is glass or a polycarbonate.

17. The method for treating the surface according to claim 14, wherein a finger print-removing property is imparted to the surface of the substrate.

18. An article having a coating film formed by applying a composition for surface treatment as defined in claim 2 on the surface of a substrate, drying the organic solvent and curing the compound (A).

19. The article according to claim 18, wherein the substrate is a transparent substrate.

20. The article according to claim 19, wherein the material of the transparent substrate is glass or a polycarbonate.

21. The article according to claim 18, of which the surface has a finger print-removing property.

* * * * *